1,555,478

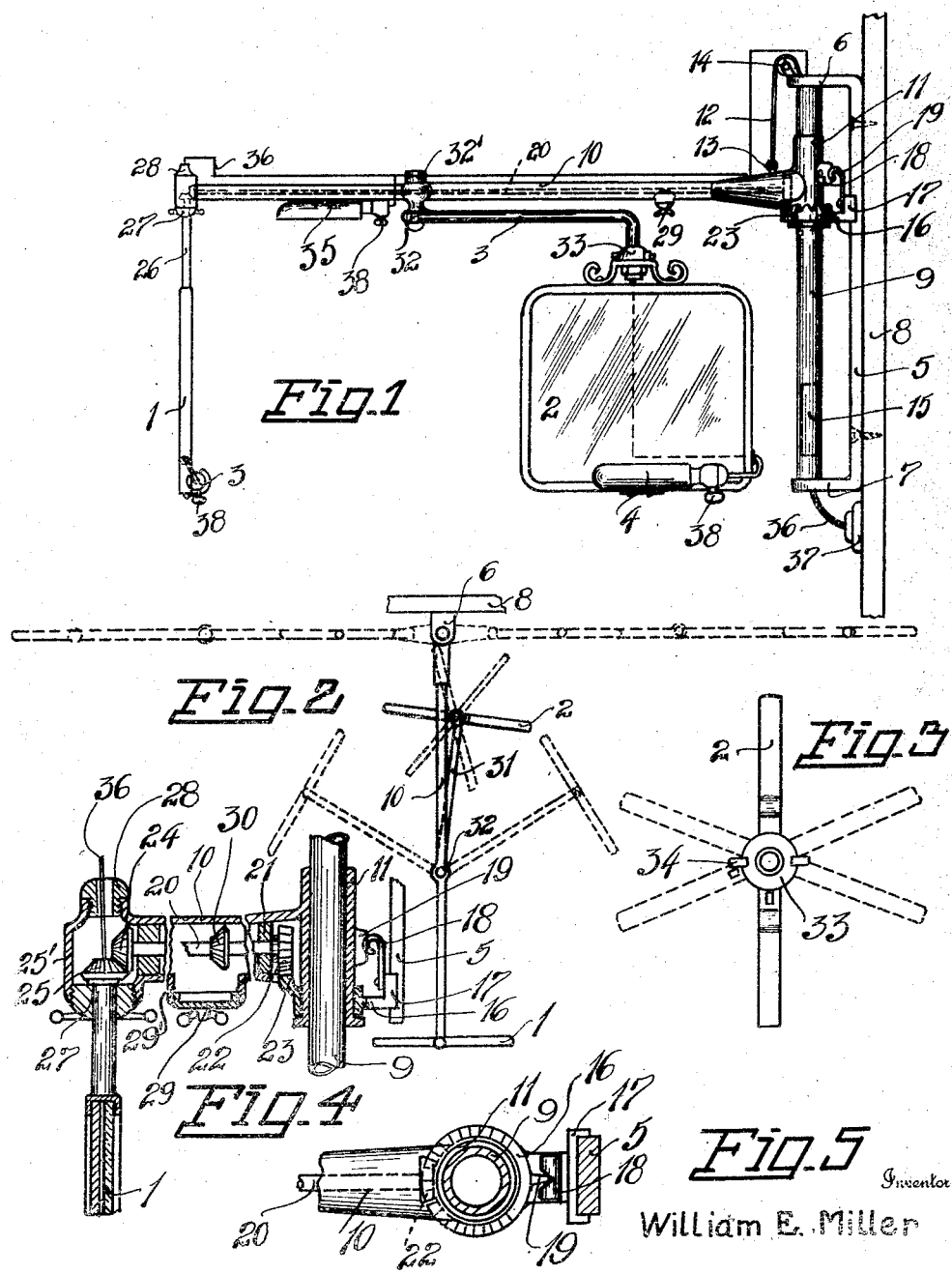
Sept. 29, 1925.
W. E. MILLER
TONSORIAL MIRROR
Filed April 13, 1925
1,555,478
Inventor
William E. Miller
By Herbert E. Smith
Attorney Patented Sept. 29, 1925.

UNITED STATES PATENT OFFICE.

WILLIAM E. MILLER, OF MULLAN, IDAHO, ASSIGNOR TO MILLER BEAUTY MIRROR COMPANY, OF MULLAN, IDAHO.

TONSORIAL MIRROR.

Application filed April 13, 1925. Serial No. 22,529.

*To all whom it may concern:*

Be it known that I, WILLIAM E. MILLER, a citizen of the United States, residing at Mullan, in Shoshone County and State of Idaho, have invented certain new and useful Improvements in Tonsorial Mirrors, of which the following is a specification.

My present invention relates to improvements in tonsorial mirrors of the duplex type that may be relatively adjusted for the purpose of enabling a guest or person having tonsorial operations performed to view the procedure and be assured of the ultimate results. The equipment is devised for use in barber shops, beauty parlors and similar places and includes a front and rear mirror that are adjustable with relation to each other and to the position of the guest, in order that the latter, especially women may acquaint themselves with the appearance of the head while having the hair trimmed, a Marcel wave imparted to the hair, or a hair-bob performed by the tonsorial artist.

The invention consists in certain novel combinations and arrangements of parts involving the two mirrors and their supports whereby the equipment may readily be brought to operative position for use, the mirrors adjusted at various angles one to another during tonsorial operations, and the equipment again returned to inoperative position when not needed, as will hereinafter be more fully pointed out and claimed.

In the accompanying drawings I have illustrated one complete example of the physical embodiment of my invention wherein the parts are combined and arranged according to the best mode I have thus far devised for the practical application of the principles of my invention.

Figure 1 is a view in elevation showing the equipment in extended position for use.

Figure 2 is a top plan view of the device of my invention showing in full lines the operative position of the mirror supporting arm and in dotted lines its retracted position and showing also by dotted lines various positions of the front mirror with relation to the rear mirror.

Figure 3 is a detail top plan view of the front mirror showing its adjustments in dotted lines.

Figure 4 is a vertical sectional detail view, partly broken away showing the supporting arm and head, the back mirror and operative connections therefor.

Figure 5 is a horizontal sectional view at the swiveled head of the supporting arm.

In carrying out my invention I utilize an outer or rear mirror 1 and an inner or front mirror 2 which are provided with illuminating lamps 3 and 4 respectively. These mirrors are disposed in vertical planes and are adapted to be brought to position after the guest is seated in order that the guest will face the mirror 2 and be enabled to adjust this mirror with relation to the rear mirror 1. By this adjustment the image in the mirror 2 will show the back of the head or the sides and back as desired, and the mirror 2 may be manually adjusted to various positions or angles with relation to the mirror 1 as indicated in dotted lines in Figure 2.

The equipment is supported on a vertical bracket 5 having upper and lower horizontal flanges 6 and 7 and securely affixed as by screws to a wall plate or wall as 8 in Figure 1. Between the two flanges is supported a vertical tubular post 9 about which an arm 10 is adapted to swing through an arc of 180° as indicated by the dotted lines in Figure 2.

This arm carries the two mirrors that are suspended therefrom and is fashioned with a swiveled hub sleeve 11 adapted to swing on the tubular post 9. The suspending arm and its mirrors and connections are vertically adjustable on the post 9 and are counterbalanced to permit facile movement by means of a cable 12 attached to the arm at 13. The cable passes over a guide pulley 14 journaled on the top flange 6 of the bracket plate 5 and has a counterbalancing weight 15 at its free end to suspend the suspending arm and its accessories.

In connection with the swiveled hub sleeve 11 I employ a non-rotatable head 16 which is slidable on the swivel 11 and is located over the hub sleeve. This head has a laterally projecting, flanged bracket 17 that slidably engages the supporting bracket 5 to guide the supporting arm in its vertical adjustment and to hold the head 16 against rotation on the post 9.

When the arm 10 is swung to either side of the post as indicated by dotted lines in Figure 2 to retracted or inoperative position, the back mirror 2 is automatically maintained in its position parallel with the wall or wall plate 8, and when the arm 10 is swung to position perpendicular to or at right angles to the wall plate 8 this same parallel position of the mirror 1 is maintained as in Figures 1 and 2. For this purpose a rotary shaft 20 is journaled in the hollow arm 10 in bearings 21 and provided with an actuating gear 22 fixed thereon which meshes with the arcuate rack 23 on the non-rotatable head 16. Thus as the arm is turned the gear rolls on the rack to turn the shaft. A spring 18 on the head engages a lug 19 on the loose sleeve 11 to lock the arm in adjusted position.

At its outer end the shaft is provided with a bevel gear 24 which engages a complementary bevel gear 25 carried in the bearing head 25' at the end of the arm 10. This latter bevel gear is fixed on the stem or rod 26 of the mirror 1 and is journaled in a bearing plug or cap 27 screwed itno the lower open end of the hollow head 25'. At its upper end this bearing head 25' is provided with an open screw cap 28 for the guidance and admission of the electric wires 36 of the lamp circuits.

Instead of using the mirror 1 at the end of the suspending arm it may be located nearer the supporting post if desired, and for this purpose a closure nut 29 is removed which is normally threaded in an annular flange 29' on the underside of the arm 10 is removed and replaced by the cap 27 of the mirror stem 26. In this position the bevel gear 25 on the stem 26 is engaged by an auxiliary bevel gear 30 on the shaft 20 for the purpose of maintaining the position of the mirror 1 when the arm 10 is swung on its hub sleeve.

The front mirror 2 is supported on a crank arm 31 pivoted at 32 on the boss 32' of the arm 10. At the top of the mirror a centrally located swivel head 33 is provided for connection with the downwardly bent free end of the crank arm in order that the mirror may be turned to various adjusted positions as indicated by dotted lines in Figure 2. By means of snaps or catches 34 the mirror may be retained in adjusted position with relation to the crank arm, and it will be apparent of course that the mirror through the crank arm may be swung to adjusted position at either side of the suspending arm 10 as indicated in Figure 2.

An additional electric lamp and reflector 35 is indicated near the free end of the arm 10 for use with the mirrors, and the wires indicated at 36 for the lamp circuits including also the lamps 3 and 4 are brought to a connector as 37 where proper control switches are provided, or switches 38 on the lamps themselves are used for controlling the lamps. The wires are carried to the respective lamps in such manner as to be invisible and extend through tubular parts of the equipment and between parts of the mirrors for concealment.

Under some conditions it is desirable to locate the mirror 1 between the pivotal support of the mirror 2 and the post 9 as described in the use of the bevel gear 30, and the same relative adjustment of the mirror 2 may be had for the convenience of the guest.

When not in use the entire equipment is swung to either side of the post 9 as indicated in dotted lines Figure 2 where it is out of the way of the tonsorial artist, but is readily accessible for swinging into position for use when required.

Having thus fully described my invention what I claim as new and desire to secure by Letters Patent is—

1. The combination with a pivoted horizontal arm and its vertical support and a mirror carried by said arm, of co-acting means supported by the arm post and operable by swinging movement of the arm for maintaining the mirror in the same vertical plane regardless of the position of the arm, and an adjustable mirror carried by said arm.

2. The combination with a supporting post, an arm pivoted thereon and a mirror pivoted on said arm, of co-acting means supported by the arm post and operable by swinging movement of said arm for maintaining the mirror in the same vertical plane regardless of the position of the arm, means for vertically adjusting the arm on the post, and an adjustable mirror carried by said arm.

3. The combination with a supporting post, a pivoted tubular arm and a mirror pivoted on said arm, of a shaft carried in the tubular arm, means for revolving the shaft by swinging movement of the arm and means operated by the shaft for maintaining the mirror in the same vertical plane regardless of the position of the arm.

4. The combination with a supporting post and a non-rotatable head thereon having an arcuate rack, of a hollow suspending arm having a loose sleeve on the post, a mirror pivotally supported on the arm, a shaft within the arm having a gear for engagement with the rack, and means actuated by the shaft as the arm is swung for maintaining the mirror in a single vertical plane.

5. The combination with a supporting post and a non-rotatable head thereon having an arcuate rack, of a tubular suspending arm having a loose sleeve on said post, means co-acting with the head and sleeve for retaining the arm in adjusted position, a shaft in the tubular arm having a gear engaging the rack, a mirror having a stem disposed at right angles to said shaft and journaled in the arm, and bevel gears between said shaft and stem.

6. The combination with a supporting post and non-rotatable head thereon having an arcuate rack, of a tubular suspending arm having a loose sleeve on the post, a shaft in the tubular arm having a gear engaging said rack, a mirror having a stem journaled in said arm, bevel gears connecting said shaft and stem, and a second mirror carried by said arm adapted for adjustment with relation to the first mirror.

In testimony whereof I affix my signature.

WILLIAM E. MILLER.